(12) United States Patent
Erlingsson et al.

(10) Patent No.: US 8,677,141 B2
(45) Date of Patent: Mar. 18, 2014

(54) ENHANCED SECURITY AND PERFORMANCE OF WEB APPLICATIONS

(75) Inventors: Ulfar Erlingsson, San Francisco, CA (US); Yinglian Xie, Cupertino, CA (US); Ben Livshits, Kirkland, WA (US); Cedric Fournet, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1229 days.

(21) Appl. No.: 11/944,460

(22) Filed: Nov. 23, 2007

(65) Prior Publication Data

US 2009/0138937 A1    May 28, 2009

(51) Int. Cl.
| | |
|---|---|
| G06F 11/30 | (2006.01) |
| H04L 9/32 | (2006.01) |
| G06F 12/14 | (2006.01) |
| G06F 7/04 | (2006.01) |
| G06F 11/00 | (2006.01) |
| H03M 13/00 | (2006.01) |
| G06F 9/44 | (2006.01) |

(52) U.S. Cl.
USPC ............. 713/187; 713/168; 713/188; 726/22; 726/26; 714/1; 714/48; 714/52; 714/758; 717/115; 717/126; 717/127

(58) Field of Classification Search
USPC ........... 726/22, 26; 713/168, 187, 188; 714/1, 714/48, 52, 758; 717/115, 126, 127
See application file for complete search history.

(56) References Cited

U.S. PATENT DOCUMENTS

| | | | |
|---|---|---|---|
| 7,207,065 B2 | 4/2007 | Chess et al. | |
| 7,237,265 B2 | 6/2007 | Reshef et al. | |
| 2003/0159063 A1 | 8/2003 | Apfelbaum et al. | |
| 2004/0260754 A1 | 12/2004 | Olson et al. | |
| 2005/0091536 A1* | 4/2005 | Whitmer et al. | 713/201 |
| 2005/0177635 A1* | 8/2005 | Schmidt et al. | 709/226 |
| 2005/0193369 A1* | 9/2005 | Brumme et al. | 717/106 |
| 2005/0268326 A1 | 12/2005 | Bhargavan et al. | |
| 2006/0015728 A1 | 1/2006 | Ballinger et al. | |
| 2006/0101409 A1 | 5/2006 | Bemmel | |

(Continued)

OTHER PUBLICATIONS

Erlingsson, et al., "Mutation-Event Transforms: A Flexible Client-side Foundation for End-to-end Web 2.0 Security", pp. 1-2.

(Continued)

*Primary Examiner* — Aravind Moorthy
(74) *Attorney, Agent, or Firm* — Micah Goldsmith; Andrew Sanders; Micky Minhas

(57) ABSTRACT

A client-side enforcement mechanism may allow application security policies to be specified at a server in a programmatic manner. Servers may specify security policies as JavaScript functions included in a page returned by the server and run before other scripts. At runtime, and during initial loading, the functions are invoked by the client on each page modification to ensure the page conforms to the security policy. As such, before a mutation takes effect, the policy may transform that mutation and the code and data of the page. Replicated code execution may take place at both the client and the server where the server runs its own shadow copy of a client-side application in a trusted execution environment so that the server may check that the method calls coming from the client correspond to a correct execution of the client-side application The redundant execution at the client can be untrusted, but serves to improve the responsiveness and performance of the Web application.

13 Claims, 6 Drawing Sheets

(56) References Cited

U.S. PATENT DOCUMENTS

2006/0143688 A1      6/2006   Futoransky et al.
2006/0259973 A1     11/2006   Sima et al.
2006/0277462 A1*   12/2006   Umbreit .......................... 715/513
2007/0061889 A1*    3/2007   Sainaney .......................... 726/26
2007/0074188 A1      3/2007   Huang et al.
2007/0226773 A1*    9/2007   Pouliot ............................. 726/1

OTHER PUBLICATIONS

Yoshihama, et al., "Security Model for the Client-Side Web Application Environments", pp. 1-2.
Yu, et al., "JavaScript Instrumentation for Browser Security", Date: 2007, pp. 237-249.
Chong, et al.,"Secure Web Applications via Automatic Partitioning", pp. 1-14.

* cited by examiner

ENHANCED SECURITY AND PERFORMANCE OF WEB APPLICATIONS

BACKGROUND

Web applications provide end users with client access to server functionality through a set of Web pages. These pages often contain script code to be executed dynamically within the client Web browser. Most Web applications aim to enforce security policies, such as, for Web-based e-mail, disallowing any scripts in untrusted e-mail messages. However, Web applications are subject to attacks, such as cross-site scripting, cookie theft, session riding, browser hijacking, and self-propagating worms.

Of the current attacks on Web applications, those based on script injection are by far the most common. For example, script injection is used in cross-site scripting and Web application worms. A script injection vulnerability may be present whenever a Web application includes data of uncertain origin in its Web pages, e.g., a third-party comment on a blog page is an example of such untrusted data. In a typical attack, malicious data with surreptitiously embedded scripts is included in requests to a benign Web application server. Later, the server may include that data and scripts in Web pages it returns to unsuspecting users. Since Web browsers execute scripts on a page with Web application authority, these returned scripts can give attackers control over the users' Web application activities and/or client devices.

SUMMARY

A client-side enforcement mechanism may allow application security policies to be specified at a server in a programmatic manner. Servers may specify security policies as JavaScript functions included in a page returned by the server to a client, and run before other scripts. At runtime, and during initial loading, the functions may be invoked by the client on each page modification to ensure the page conforms to the security policy. As such, before a mutation (defined as any modification to the structure, including data and code, of the page) takes effect, the policy may transform that mutation and the code and data of the page.

Replicated code execution may be used on both the client and the server where the server runs its own shadow copy of a client-side application in a trusted execution environment, so that the server may check that the method calls coming from the client correspond to a correct execution of the client-side application. If the server receives a call from the client that is not issued by its trusted shadow copy, the server may ignore this call or raise a security alert.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
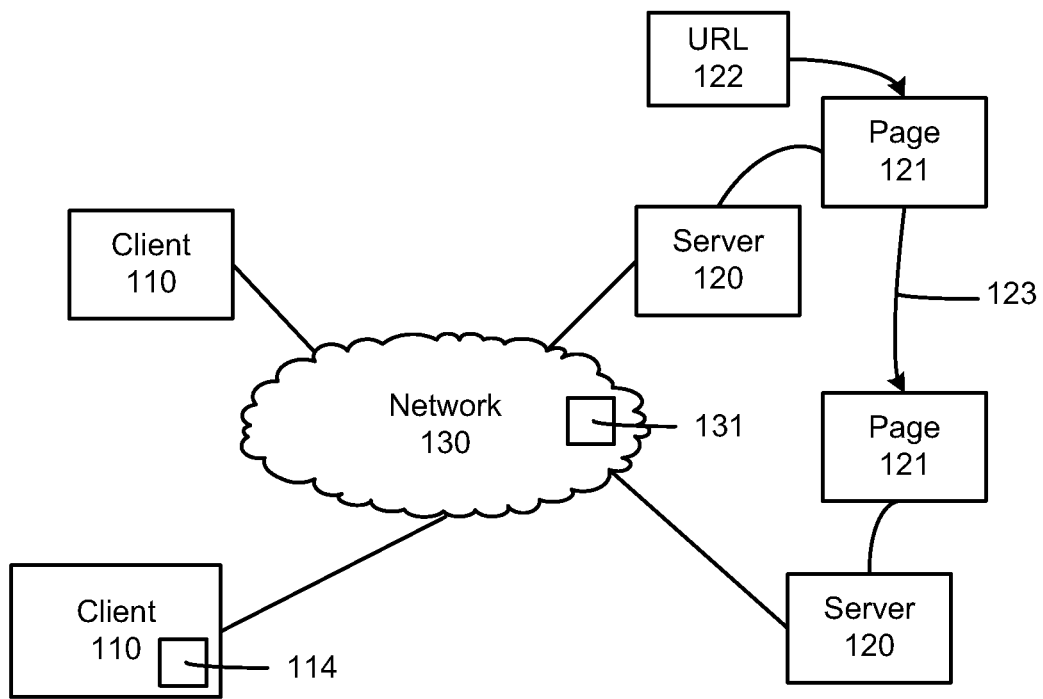
FIG. 1 illustrates an exemplary environment.
Figure 2:
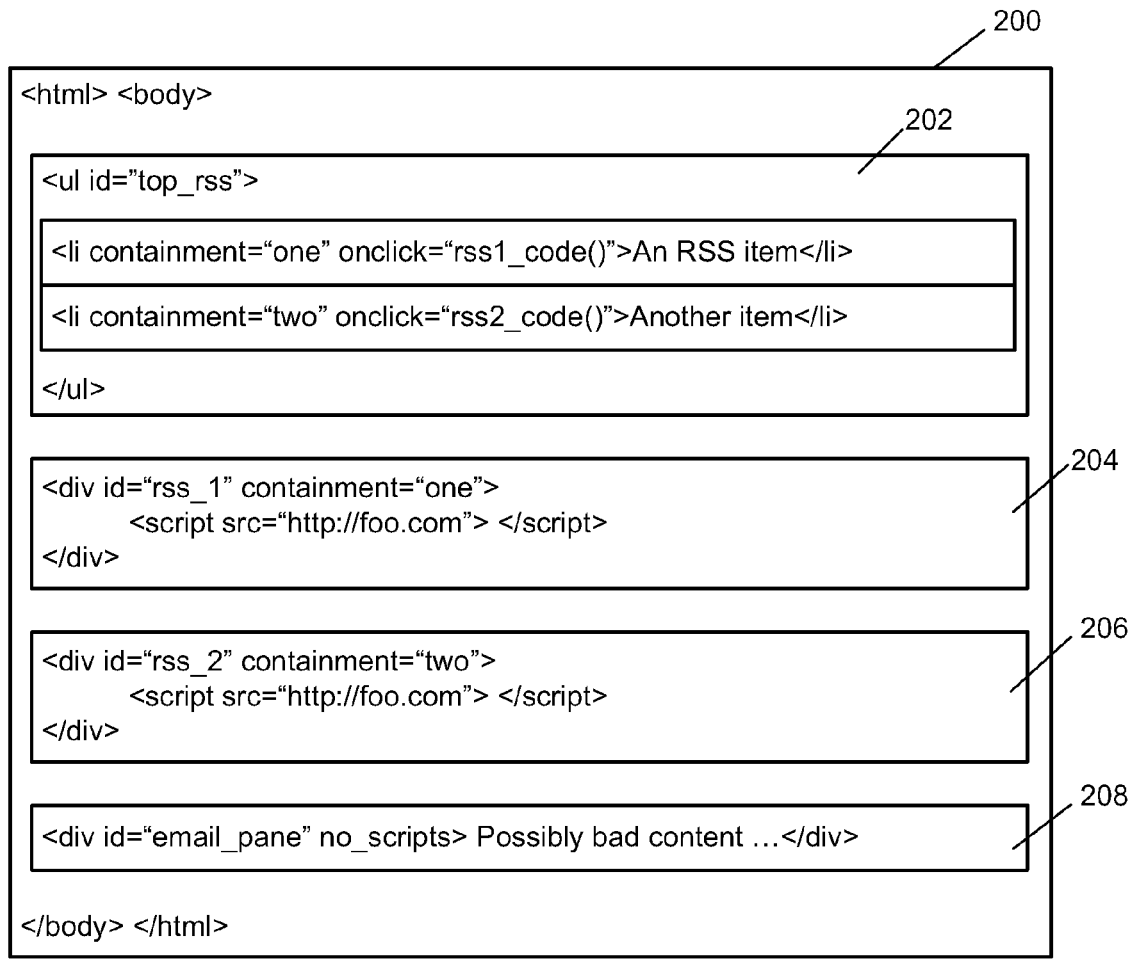
FIG. 2 is an exemplary document tree within a Web page.
Figure 3:
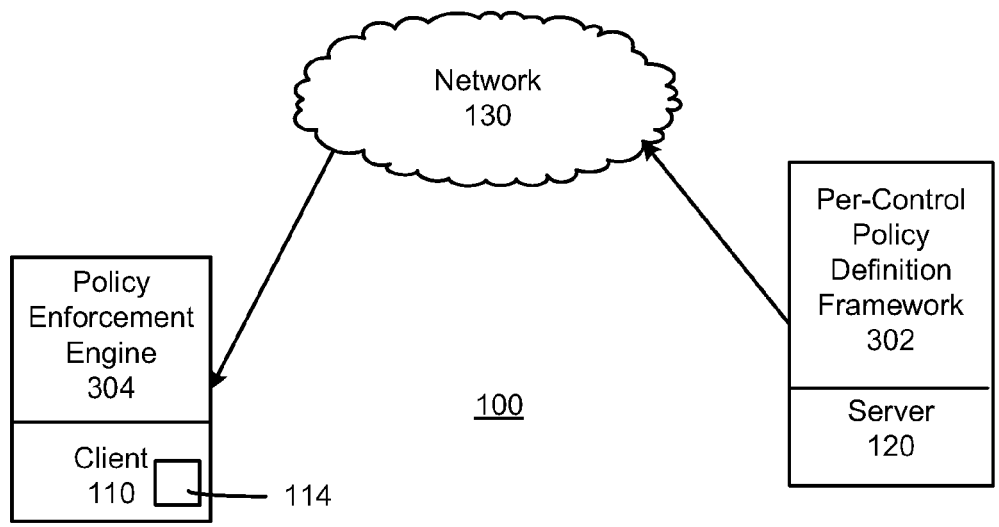
FIG. 3 illustrates a block diagram of an exemplary implementation of system components within the environment of FIG. 1.

FIGS. 1-3 illustrate an exemplary environment 100 and information communicated between servers and clients. The environment 100 includes client computers 110 and server computers 120 (generally "hosts") connected to each other by a network 130, for example, the Internet, a wide area network (WAN) or local area network (LAN). The network 130 provides access to services such as the World Wide Web (the "Web") 131. The Web 131 allows the clients 110 to access documents containing text-based or multimedia content contained in, e.g., pages 121 (e.g., Web pages or other documents and data) maintained and served by the servers 120. Typically, this is done with a client application 114 (e.g., a browser application program, a network-enabled application program, e-mail client application, file transfer client, etc.) executing in the client 110. The location of each page 121 is indicated by an associated Universal Resource Locator (URL) 122 that is entered into the client application 114 to access the page 121. The pages 121 may include hyperlinks 123 to other pages 121. The hyperlinks 123 are also in the form of URLs.

Although the implementation is described with respect to documents that are pages, it should be understood that the environment can include any data and/or objects having content and connectivity that can be characterized.

The technology infrastructure of the Web 131 may include server-software, content-syndication, messaging-protocols, standards-based browsers with plugins and extensions, and various client-applications. These differing, yet complementary approaches provide the Web 131 with a growing set of information-storage, creation, and dissemination capabilities.

The servers 120 may provide rich Internet application techniques, including, but not limited to: Ajax-based, semantically valid XHTML and HTML markup, microformats enriching pages with additional semantics, Cascading Style Sheets (CSS) to separate presentation from content and REST and/or XML- and/or JSON-based APIs. In addition, the servers 120 may provide RSS or Atom feeds, merged content from different sources (e.g., mashups), weblog publishing tools, Wiki or forum software, etc.

In some implementations, Web-based applications and desktops may be provided. Ajax may provide applications that mimic personal computer applications, such as word processing, the spreadsheet, and slide-show presentation. In other implementations, browser-based "operating systems" or "online desktops" may be provided that act as application platforms. These services mimic the user experience of desktop operating-systems, offering features and applications similar to a PC environment. They have as their distinguishing characteristic the ability to run within any modern browser.

In some implementations, client applications 114 may interact with data stored on servers 120. This may be accomplished through forms in an HTML page, through a scripting language such as JavaScript, or through Flash, Silverlight or Java. These methods make use of the client 110 to reduce server workloads and to increase the responsiveness of the application.

In some implementations, client applications 114 may include a security mechanism (e.g., policy enforcement engine 304) to enforce security policies based on monitored client application behavior. The security mechanism may support policies that range from disallowing use of certain Web client features (e.g., IFRAMEs or OBJECTs) to fine-grained, application-specific invariants such as taint-based policies that regulate the flow of credit-card information input by the user.

In some implementations, the security mechanism may utilize Mutation-Event Transforms (METs) that allow Web application security policies to be specified at the server 120 in a programmatic manner (using a per-control policy definition framework 302), such that the specifications may be used directly for enforcement at the client 110. In an implementation, a security policy mechanism (which may implement METs) may be coded as follows:

```
HTMLDocument.prototype.__defineGetter__(
    "cookie",
    function( ){ return null; }
);
```

Using METs, servers 120 may specify security policies as JavaScript functions included in a page 121 returned by the server 120 to the client 110, and run before other scripts. At runtime, and during initial loading, the MET functions are invoked by the client 110 on each Web page modification to ensure the page conforms to the security policy. As such, before a mutation takes effect, METs may transform that mutation, and the code and data of the page. Such monitoring and transformation gives METs great flexibility in enforcement. METs may be used to implement inlined reference monitors and edit automata for security-relevant client events, which enable METs to be used to specify and enforce any security policy based on monitoring client behavior.

In an implementation, METs may be an extension to the Document Object Model (DOM), level-2, mutation events caused by an action that modifies the document structure. METs may operate on extended data that include both the standard DOM tree model and the abstract syntax trees (ASTs) of executable scripts. METs may provide mutation events for <SCRIPT> nodes as follows: an event when the script node is inserted in the DOM, and another event when that inserted node is populated with the AST for its script code. This separation allows METs to enforce security policies that limit network access caused by SRC host URL attributes in script nodes. Other nodes, such as <STYLE>, may also be handled in this manner.

In an implementation, the type signature of MET callback functions may be as follows:

```
ExtendedNode
MET_callback(in Node script, // source of mutation
             in Node target, // target in Web page
             in ExtendedNode oldValue,
             in ExtendedNode newValue);
```

In an implementation, the script and target are DOM nodes in the document tree. The script refers to the node containing the script that is attempting the document mutation (e.g., by writing to an innerHTML field). The target refers to the parent node where newValue is about to be inserted to replace oldValue. Both oldValue and the newValue are well-formed, properly nested subtrees of our extended DOM that includes ASTs; either may be null to denote empty subtrees. Each callback function returns an extended DOM subtree to be used (instead of newValue).

MET callback functions may be registered for DOM elements of particular types, e.g., as follows:

add_MET_callback (nodetype, policy)

In the above, "policy" would be invoked whenever a DOM element of type nodeType is affected (i.e., inserted, replaced, or deleted). This may happen at runtime, before the mutation, but after the client application 114 has parsed the new, proposed extended DOM values.

In an implementation, programmatic security policy variables and functions and MET callback registration, may be placed in the first <SCRIPT> tag of a Web page 121. To prevent subversion of security enforcement, the script language scoping rules may prevent access to security policy code and further MET callback registration might be disabled, e.g., by setting document.prototype.add MET callback to null in the code. In other implementations, client applications 114 may allow other scripts to register MET callback functions.

In an implementation, security policies may use programmatic MET callback functions written in JavaScript. At runtime, MET callback functions operate on each new (or updated) Web page 121 and ensure that it conforms to the security policy, either through validation or transformation of the code or data within the Web page. In other implementations, code for METs may be provided as pre-packaged libraries or be determined at the server.

In an implementation, METs may be used for client-side enforcement of application-specific dynamic security policies determined automatically at the server from the natural constraints imposed by the structured composition of client pages (e.g., using frameworks such as ASP.NET, AJAX, GWT, etc.). METs may also enforce other rich policies, such as those that apply to "Web 2.0" cross-domain mashups, where application pages are composed outside the server enforcement.

In an implementation, user interface widgets, such as drop-down lists, trees, rich-text content panes, etc. act as a principal. The code associated with the widget may be associated with the principal so that it can only access DOM elements within the widget itself. The client application 114 may walk the DOM tree to determine the origin of a document containing a portion of embedded script. However, in this case, the DOM traversal within the Web client 113 may stop at the most deeply nested element that is annotated with a principal.

The same-origin policy of JavaScript limits access to DOM and other Web client resources, such as cookies, by tracking the origin of a particular piece of code. The principal in the default same-origin scheme is a triple (e.g., host, protocol, port) and the origin of a piece of JavaScript is determined by where it is embedded in the HTML DOM. In some implementations, the origins of a DOM element and a piece of script may be determined by walking to the top of the DOM tree. Accordingly, JavaScript access to DOM may be allowed if the origin, as encoded by the triple above, is the same.

In some implementations, application-specific principals that can be attached to an arbitrary DOM element may be allowed in addition to the default same-origin scheme. As the client application 114 walks up the DOM tree, the principal list may be collected.

For example, in the following:

```
<div principal='blog-body'>
    <b>Blog entries</b>
    <div principal='blog-entry'>
        today's entry
    </div>
    <div principal='blog-entry'>
        yesterday's entry
    </div>
</div>
``` both "today's entry" and "yesterday's entry" will have the principal list blog-body; blog-entry. As such, JavaScript code embedded within either of these entries may be able to access the other entry. In other implementations, generating unique principals for individual entries such as blog-entry-1, blog-entry-2 . . . will provide stronger isolation. The order of principals may determine access, i.e., code annotated with principal list blog-body; blog-entry will not be able to access DOM with principal list blog-entry; blog-body.

The principals may also represent DOM elements and events, code identity, and the client-user input actions. An object of the access control system may include the entire DOM tree, all script code and variables, and external activity, such as file access and network requests. Objects may be extended to include resources such as screen real-estate (to prevent spoofing), memory, and CPU resources to prevent denial-of-service.

In an implementation, general security policies may be applied to a Web page, its script code, and the nodes and attributes of document data. Such policies may include, but are not limited to:

(1) Disallow certain dangerous nodes or attributes.

<IFRAME> nodes may be disallowed and <OBJECT> nodes only permitted when instantiating the Flash player with known content.

(2) Data invariants on certain document subtrees.

The Web page document may be subject to invariants, even when modified dynamically at the client; e.g., blog comments must be a well-formed list of <DIV> nodes.

(3) Disallow scripts in certain parts of a Web page. Disallow use of <SCRIPT> nodes in untrusted blog comments.

(4) Scripts match valid, server-defined templates.

New, client-defined scripts may be allowed, but, for example, the onHover script code for a dynamically-inserted list item may be required to match highlight (identifier).

(5) Cross-domain scripts return only data, properly.

Prevent unexpected introduction of new code by cross-domain client-mashup applications: for instance, any script returned into a cross-domain <SCRIPT> node may have a syntax tree that matches ajaxCallback(jsonDataValue).

(6) Limit scripts to a static, server-defined set.

Match the hash of the script source text against a fixed "whitelist".

(7) Constrained access to object fields and methods.

Provide partial access to document.cookie or limiting arguments to network-access methods.

(8) Proper network access via (cross-domain) URLs.

URLs are subject to access control—both node-attribute URLs (e.g., on <IMG>) and the URLs used programmatically in scripts, (e.g., in an XML request).

(9) Containment of script activity to certain subtrees.

Scripts may only modify certain document subtrees; thus, a gadget (or client-side mashup) for Web search might only be allowed to mutate a <DIV> for search results.

(10) Script execution by a secure interpreter.

Scripts are not executed directly, but through a special, security-enhanced interpreter or even more fine-grained policies, such as variants of stack inspection or data tainting.

It is noted that additional or fewer policies may be specified and that policies (1) through (10) are not exhaustive. In the above, policies (1), (3), and (6) may restrict potentially dangerous types of document nodes, while allowing scripts only in certain portions of the document, or may limit scripts to a whitelist of trusted scripts. Policies (2), (4), and (5) may validate the structure of certain data structures and scripts in Web pages, which may prevent many types of attacks (e.g., attacks that use malformed SQL queries). Without such validation, malicious attacks may exploit benign client-side code by presenting it with malformed data. For instance, without enforcement of policy (5), the client application 114 may execute new, unexpected code where only a data return value was expected. Client-side data validation may also reduce the number of round trips to the server.

Policies (7) through (9) demonstrate that policies supported by METs may include constraints on network access or access to security-critical client variables, such as the Web client browser history, and enforce containment scopes between client-side gadgets and modules. Policy (10) demonstrates that security policies based on METs may include the code for a security-enhanced JavaScript interpreter and ensure that it is used to execute all script code. Such a customized interpreter may implement dynamic taint propagation or other complex security policies.

In an implementation, the above security policies may be readily instantiated using MET callback functions. Such callback functions may include, but are not limited to:

```
(1) Limit OBJECT nodes (on OBJECT events):
    var ok = (newValue.classid == theAllowedGUID);
    return (ok) ? newValue : null;
(2) Data invariant on inserted DIVs (on DIV events):
    if (target.id != insertionParentID) return null;
    if (oldValue != null) return null;
    var ok = ExtDOM.MatchStructure(newValue,
        "<div><ul><li></li></ul></div>");
    return (ok) ? newValue : null;
(3) Limit script placement (on SCRIPT events):
    var ok = ! findParentAttr("no_scripts", target);
    return (ok) ? newValue : null;
(4) Restrict the code in scripts (on SCRIPT events):
    var ok = ExtDOM.MatchScriptStructure(newValue,
        "highlight('identifier');"
    return (ok) ? newValue : null;
(5) Proper data in AJAX replies (on SCRIPT events):
    if (! newValue instanceof ScriptBody) return null;
    var ok = ExtDOM.MatchScriptStructure(newValue,
        "callback({count: 1; sum: 5;});"
    return (ok) ? newValue : null;
(6) Script whitelisting (on SCRIPT events):
    var ok = whitelist[ hash(newValue.toString( )) ];
    return (ok) ? newValue : null;
(7) Disallow history access (on SCRIPT events):
    if (! newValue instanceof ScriptBody) return null;
    return ExtDOM.ReplaceScriptLiteral(newValue,
        "history", "fresh_unused_literal");
(8) Limit network access (on SCRIPT events):
    var ok = matchURLDomain(newValue.src, "foo.com");
    return (ok) ? newValue : null;
(9) Script containment (on any mutation event):
    var src = outmostAttr("containment", script);
    var dst = outmostAttr("containment", target);
```

-continued

```
            return (src == dst) ? newValue : null;
        (10) Secure interpreter (on SCRIPT events):
            if (! newValue instanceof ScriptBody) return null;
            var arg = ExtDOM.CreateScriptNode("Arguments",
                newValue.ToJSON( ));
            var func = "special_js_interpreter";
            return ExtDOM.CreateScriptNode("Call", func, arg);
```

In some implementations, METs may support callback routines defined by a security policy code. For example, the matchURLDomain function in (8) may match string URLs in a policy-specific manner, while the outmostAttr function in (9) may recursively walk up the document tree to find an attribute definition closest to the root. Similarly, policy-specific variables may encode security-relevant state such as in (1) for allowed ActiveX GUIDs (e.g., the Flash player), and in (2) the identity of a particular node in the document structure of a Web page.

In an implementation, the security policies may be application-specific and perform access control within a page 121. FIG. 2 is an exemplary document tree 200 within a Web page 121, and shows an example of a DOM tree 202 containing data from two RSS sources: rss 1 and rss 2. Here, rss2 code should not modify the first <div> element 204 to prevent a rogue RSS feed from changing the contents of another one. The code associated with rss1 should not modify the second <div> element 206. Likewise, neither rss1 code, nor rss2 code should be able to modify the third <div> element 208 that will display e-mail. By implementing security policy (9), the code may be restricted to modifying only DOM elements declared within the same scope. This policy provides for isolation of code and data on a single page 121. FIG. 2 also illustrates that a security policy may be directed by inline attributes on document nodes. In this case, a no-script attribute is used to direct MET enforcement of a policy such as (3).

In another implementation, a developer may write an application in Java that is subsequently compiled into two parts: a Java part that resides on the server and a JavaScript part that resides on the client. In a client-side attack, the assumptions of the original Java application may not hold for the scripts at the client. To prevent this, the server may generate policies that enforce consistency properties of the client code. For example, the server may ensure that access control properties such as "a private method may only be invoked by methods in the same Java class" present in the original Java source code are preserved in the JavaScript code on the client side. Instantiation of such a policy may be application-dependent and could be obtained through static analysis of the original Java code.

In another implementation, server-generated content templates may provide for dynamic policy generation in, e.g., ASP.NET or JSP pages. These technologies allow servers to mix static HTML and dynamic content. Using static analysis, the computed parts of a Web page 121 may be approximated and, thereby, the structure and contents of generated pages. For example, the analysis may be directed to assume no permitted scripts in application inputs. Such page "templates" are highly suitable for client-side enforcement.

Referring to FIG. 3, in an implementation, individual frameworks may define a system of principals associated with GUI widgets that they provide. In an implementation, the per-control policy definition framework 302 may implement AJAX.NET which provides an ajaxToolkit:TabContainer element, which may be used for creating tabbed user interfaces. AJAX.NET may generate unique principals for each tab, ensuring that neither can access each other. When the final HTML code is produced, either on the server or the client side, these principals may be injected in to the code. The isolation may then be accomplished through the changes to the same-origin policy, as described above, in the policy enforcement engine 304.

In some implementations, principals may also be manipulated programmatically, through changing the attributes of the surrounding DOM element, by calls to getAttribute and setAttribute. As such, a defined principal may be functionally equivalent to one that was assigned programmatically, and only JavaScript that has the permission to access a DOM element will be able to call setAttribute on it. This prevents malicious JavaScript from re-assigning principals.

Figure 4:
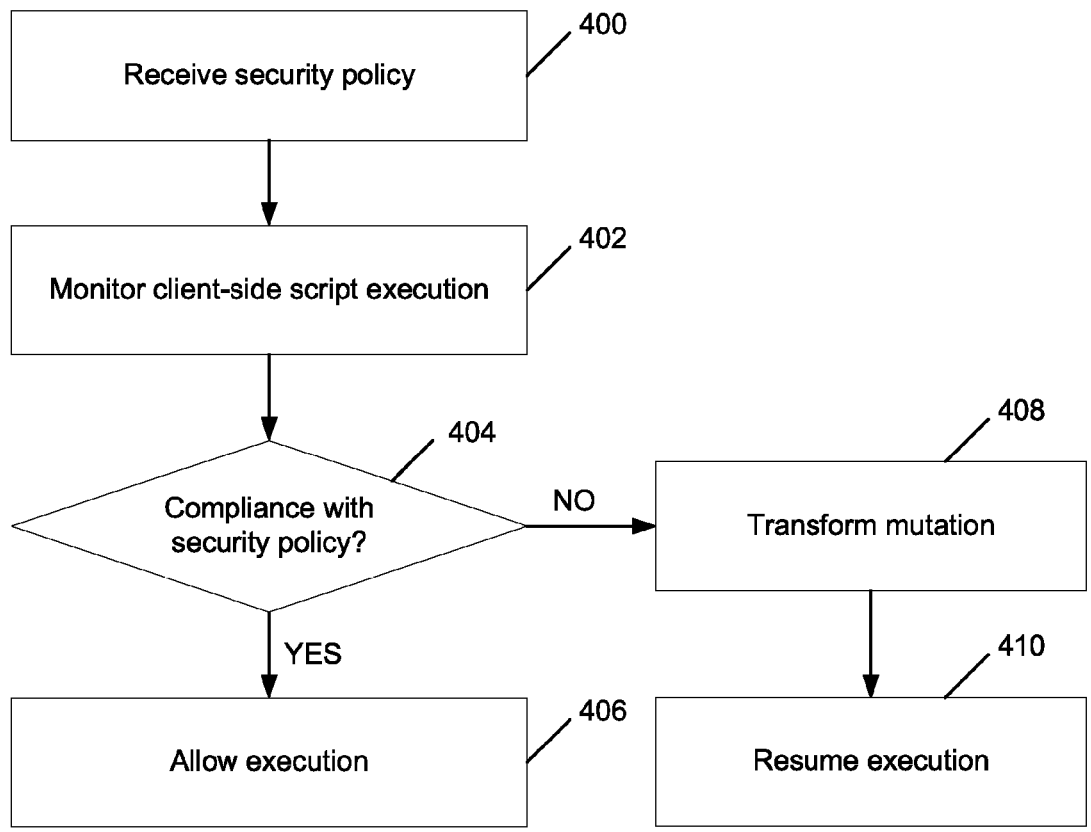
FIG. 4 is an operational flow of an implementation of a method of enforcing a security policy.

Programmatic access to principals may be used for principal delegation, i.e., a piece of JavaScript code that has access to a DOM element may enable another piece of JavaScript code with the same principal to access the DOM element. Similarly, principals on a piece of JavaScript code, such as a function, may be changed as well by assigning to the field principal, such as for instance, button.onclick=function( ){ ... } may be rewritten as button.onclick=function( ){ . . . } button.onclick.principal='blog-entry';

Referring to FIG. 4, this is illustrated as an operational flow of an implementation of a method of enforcing a security policy. At stage 402, a security policy is received by the client. The client 110 may receive a Web page 121 from the server 120 containing JavaScript functions defining the security policy. At stage 404, a client-side script execution process is monitored. The client 110 may monitor operations performed by the client application 114. At stage 406, it is determined if the client-side script execution process complies with the security policy. The security policies noted above may be instantiated using callback functions when the web page 121 is modified by the client application 114 or a user input. If the execution conforms to the security policy, execution continues at stage 408. If the execution does not conform to the security policy, then a mutation is transformed. The code or data that does not comply with the security policy may be rewritten to conform to the security policy at the client 110. Execution of the code continues at stage 410.

Figure 5:
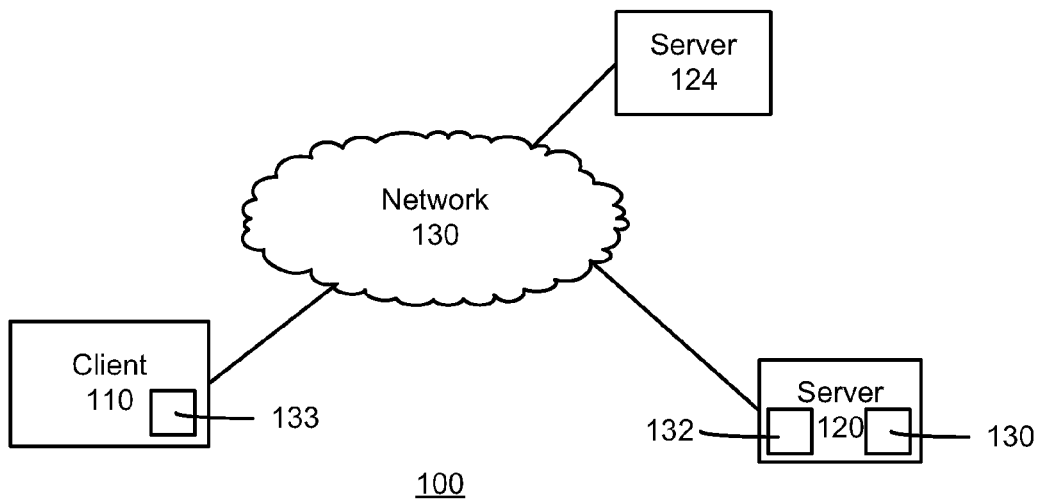
FIG. 5 illustrates a block diagram of exemplary implementation of system components within the environment of FIG. 1.

Referring to FIG. 5, distributed applications provided by the server 120 may be partitioned into a server-side application 130 and a client-side application 133. The client-side application 133 may run, e.g., user interfaces and other functionalities on the client 110, thereby allowing richer, more reactive interfaces. As a result, a stream of messages may be communicated between the client-side application 133 and server-side application 130, representing method calls between these two parts of the distributed application.

However, the server 120 cannot trust that the client 110 will actually run the client-side application 133 that the server 120 is providing. By running a modified application, the client 110 may break server security by calling methods of the server-side application 130 that do not correspond to any normal execution of the client-side application 133 (e.g., delete server database entries, access other client's data, etc.)

In an implementation, integrity mechanisms make use of replicated code execution on both the client 110 and the server 120. The integrity mechanisms may include the server 120 running its own shadow copy 132 of the client-side application 133 in a trusted execution environment, so that it can check that the methods calls coming from the client 110 correspond to a normal application of the client-side application 133. If the server 120 receives a call (e.g., a method call) from the client 110 that is not issued by its trusted shadow copy 132, the server 120 may ignore this call or raise some security alert. Thus, the server 120 need only review the security of its server-side application 130 using traditional techniques.

For the shadow copy 132 being replayed at the server 120 to be able to accurately "replay" the execution of the client-side application 133, the shadow copy 132 may receive the same series of input events as those received at the client 110 (e.g., mouse clicks, cookies, keyboard entries). In an implementation, the shadow copy 132 is rewritten before the client-side application 133 is transmitted to the client 110 to include additional code that collects all client-side inputs. This may generate a stream of client-to-server method calls that includes the client inputs that can be checked against those coming from the client 110. In the other direction, the stream of server-to-client messages is then replicated and sent both to the client 110 and to the shadow copy 132. In some implementations, the client 110 may collect client-side inputs and stream them to the server 120, interleaved with the series of methods calls. It is also possible to omit sending the actual client-to-server method calls, as they may be reconstructed by the server 120. In some implementations, to keep the client-side application 130 and the server-side application 132 in sync, a queue is maintained. A block of event stream is communicated to the server-side application 132 and the sequence of events is replayed from the queue.

In some implementations, the client inputs may be batched and sent to the server 120 only when the client 110 makes an actual method call (e.g., waiting until the user moves away from an input value before sending it over to the client so as to avoid sending every key click, allowing allow certain events from certain places such as keyboard events from the keyboard and not "keyboard events" generated by another server 124). Also, the shadow copy 132 may be simplified by not producing outputs that are not passed to the server-side application 130. As such, events from the event stream sent to the server 120 for applications that are irrelevant may be removed (e.g., graphical code may be removed to improve performance). It is possible to apply this approach selectively, to some secure sub-part of the client-side application 133. The selection of code and events may be performed systematically at compile time, using type systems or static analyses.

In some implementations, shadow copy 132 may perform additional security policy checks or run the code in another language (e.g., IL instead of JavaScript) for performance reasons, or to remove a security dependence on the compiler that generates client-side code. In some implementations, the client-side application 133 that is running at the client 110 is different from the shadow copy 132 that is running at the server 120. In other words, the program is the same, but the code is different. JavaScript may run on the client 110, where ASP.NET runs on the server 120.

Figure 6:
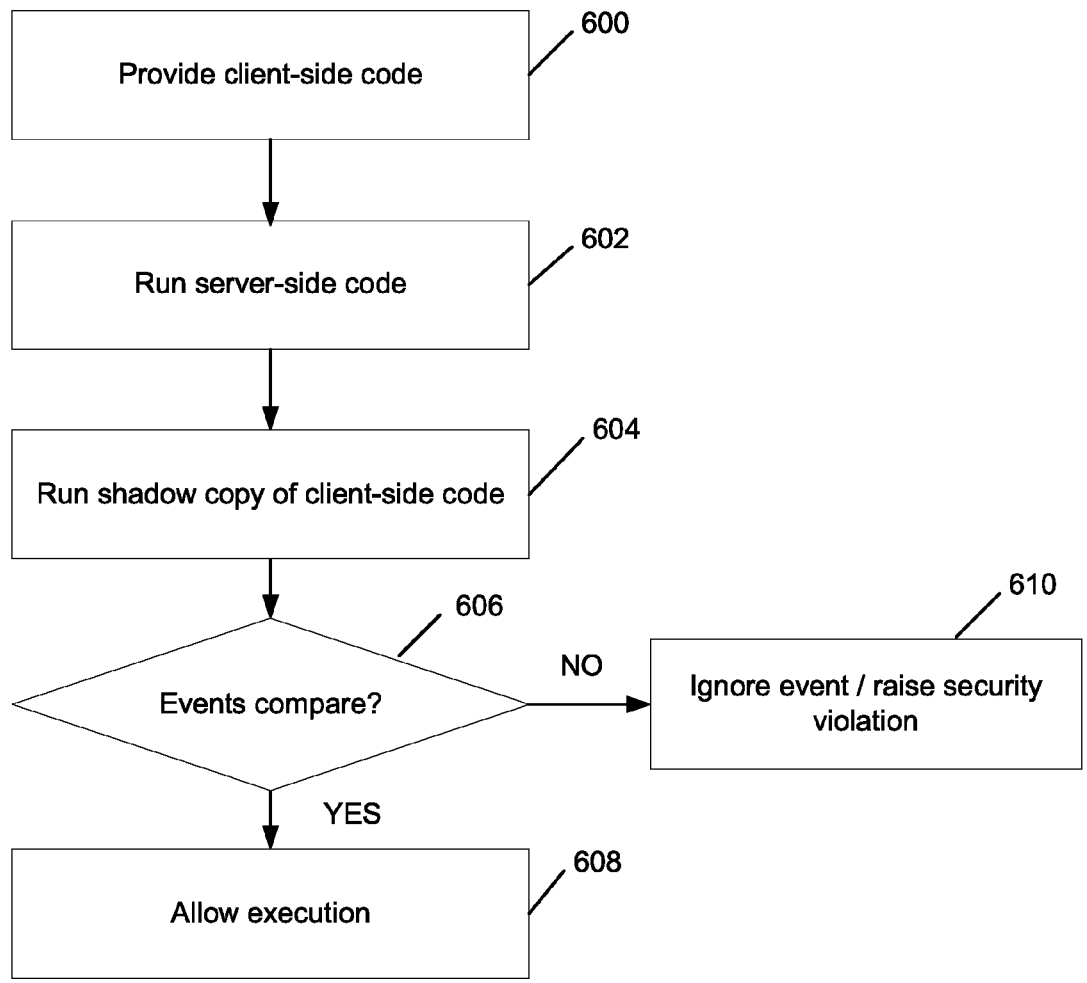
FIG. 6 is an operational flow of another implementation of a method of enforcing a security policy.

FIG. 6 is an operational flow of another implementation of a method of enforcing a security policy. At stage 600, client-side code is provided to the client 110. At stage 602, server-side code is executed by a server application running on the server 120. At stage 604, a shadow copy of the client-side code is run by the server application. The shadow copy replays the events received from, and input to, the client-side code. At stage 606, the events received by the server-side code from the client-side code executing in the client application and the shadow copy of the client-side code in the server application are compared. If the events are the same, then at stage 608, the execution continues. If the events are different, then the event from the client-side application executing at the client 110 can be ignored and/or a security alarm can be raised.

Exemplary Computing Arrangement

Figure 7:
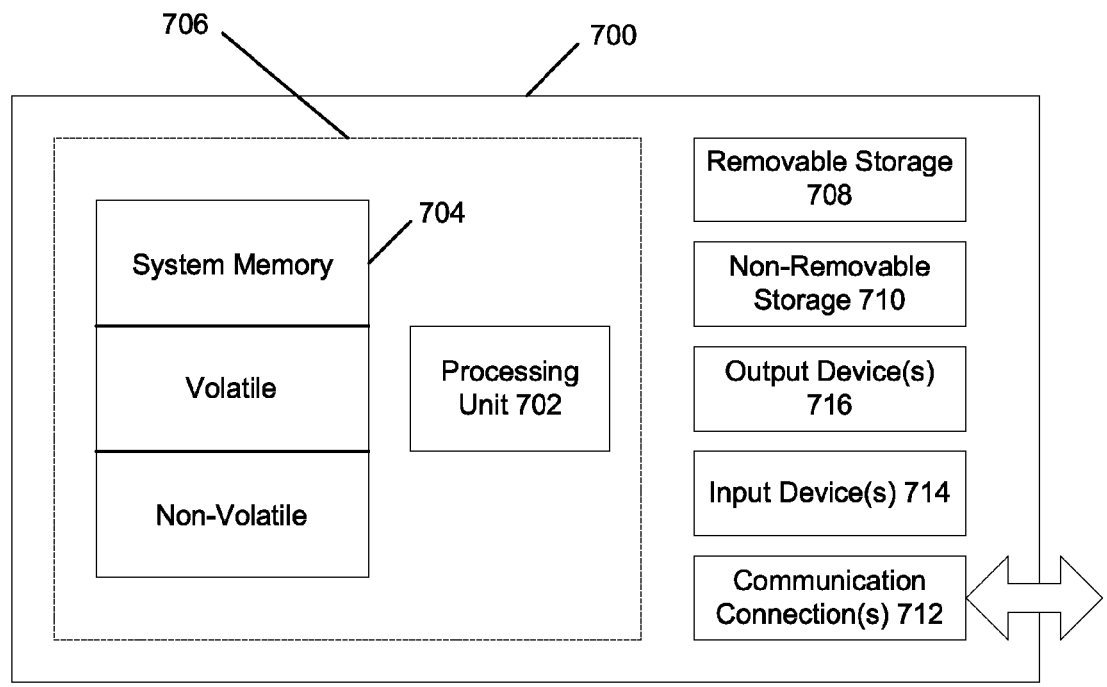
FIG. 7 shows an exemplary computing environment.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of enforcing a client-side security policy, comprising:
   receiving a security policy from a server at a client, the security policy being a script function contained in a portion of a document including a client-side script;
   monitoring a client-side script execution process;
   determining if the client-side script execution process complies with the security policy; and
   transforming a mutation if the client-side script execution process does not comply with the security policy in order to enforce the security policy, wherein transforming comprises modifying a portion of the document by rewriting code or data that does not comply with the security policy.

2. The method of claim 1, further comprising:
   parsing the document; and
   running the script function before other scripts in the document.

3. The method of claim 1, further comprising:
   executing the script function on each modification to the document.

4. The method of claim 1, further comprising:
   applying the security policy to events occurring in a document object model (DOM) that modify a structure of the document.

5. The method of claim 1, further comprising:
   specifying the security policy programmatically within the document communicated to the client.

6. The method of claim 5, further comprising:
   automatically determining the security policy in accordance with a structured composition of the document communicated to the client.

7. The method of claim 6, further comprising:
   applying frameworks to automatically determine the security policy.

8. The method of claim 1, wherein transforming the mutation if the client-side script execution fails to comply with the security policy is performed using callback functions.

9. The method of claim 1, further comprising:
   rewriting a script being executed by the client-side script execution process when the client-side script execution process fails to comply with the security policy.

10. A client-server application security system, comprising:
    a memory; and
    a processor for executing instructions comprising:
      a policy definition engine that programmatically defines a security policy from a structured composition of a client page received from a server, wherein the security policy is a script function contained in a portion of the client page; and
      a policy enforcement engine, executed by a client application running on a client, that executes a callback function that operates on modifications to the client page to determine compliance with the security policy and that transforms a script within the client page when the modifications to the client page fail to comply with the security policy, wherein transforming comprises modifying a portion of the client page by rewriting code or data that does not comply with the security policy.

11. The system of claim 10, wherein the security policy is defined as part of a framework.

12. The system of claim 10, wherein the security policy is applied to events occurring in a document object model (DOM) that modify the client page.

13. The system of claim 10, wherein the script is rewritten to comply with the security policy.

* * * * *